(12) United States Patent
Neumann et al.

(10) Patent No.: US 7,103,129 B2
(45) Date of Patent: Sep. 5, 2006

(54) SYSTEM AND METHOD FOR RATE ADAPTATION IN A WIRELESS COMMUNICATION SYSTEM

(75) Inventors: Thomas Neumann, San Diego, CA (US); Claudio Koehl, Furth i. Wald (DE)

(73) Assignee: Siemens Communications, Inc., Boca Raton, FL (US)

( * ) Notice: Subject to any disclaimer, the term of this patent is extended or adjusted under 35 U.S.C. 154(b) by 756 days.

(21) Appl. No.: 10/095,670

(22) Filed: Mar. 8, 2002

(65) Prior Publication Data

US 2002/0173338 A1  Nov. 21, 2002

Related U.S. Application Data

(60) Provisional application No. 60/276,431, filed on Mar. 15, 2001.

(51) Int. Cl.
*H04L 25/00* (2006.01)

(52) U.S. Cl. ...................................... 375/372

(58) Field of Classification Search ................ 375/371, 375/372
See application file for complete search history.

(56) References Cited

U.S. PATENT DOCUMENTS 5,327,391 A    7/1994  Hirata
5,996,018 A   11/1999  Duault et al.
6,049,565 A    4/2000  Paradine et al.
6,934,558 B1   8/2005  Sainton et al.
2002/0059434 A1  5/2002  Karaoguz et al.
2002/0126707 A1  9/2002  Tong et al.
2002/0141441 A1 10/2002  Neumann et al.

OTHER PUBLICATIONS

Andrade et al, "56KPBS rate adapter for an integrated service digital network primary card," Jun. 1990, IBM TDM, vol. 33, No. 1A.*

* cited by examiner

*Primary Examiner*—Kevin Kim

(57) ABSTRACT

A wireless telephone includes first and second baseband processors. The first baseband processor functions as system master, and the second processor functions as system slave. The first baseband processor interfaces to system controls, such as power supply, man-machine interface (MMI), and the like. The master processor implements a first pair of buffers in the downlink direction and a second pair in an uplink direction. The buffers in the pairs are swapped periodically, based on an internal counter running on the master processor. The timing of the master processor is continuously adjusted to that of the slaved co-processor, by counting a number of samples received from the microphone respectively fed to the earpiece between the beginning of consecutive frames. The timing of the master processor is then adjusted accordingly. The output of the counter may be lowpass filtered to separate jitter from frequency deviation.

28 Claims, 8 Drawing Sheets

SYSTEM AND METHOD FOR RATE ADAPTATION IN A WIRELESS COMMUNICATION SYSTEM

CROSS REFERENCE TO RELATED APPLICATIONS

This application claims priority from U.S. Provisional Application Ser. No. 60/276,431 filed Mar. 15, 2001, which is hereby incorporated by reference in its entirety as if fully set forth herein.

BACKGROUND OF THE INVENTION

This invention relates to mobile telephony and, in particular, to an improved dual mode mobile telephone.

A variety of standards have been developed for digital cellular and PCS telephone systems, based on a variety of bandwidth allocation techniques. These include the European time division multiple access (TDMA)-based Global System for Mobile communication (GSM), and the Telecommunications Industry Association (TIA) IS-136 TDMA standard (also known as North American TDMA). TDMA systems allocate unique time slots to each user within a single radio-frequency channel.

Each of these systems has widespread deployment. However, a user of a cellular telephone or PCS device that complies with one standard is inoperable in a network communicating according to another standard. Thus, typically, a user would need multiple such devices to operate in each such network. Alternatively, "dual-mode" telephones have been developed, in which the telephone is useable in two networks. However, such telephones typically require a complete baseband chipset to be provided for each of the two wireless or cordless standards. This can result in an undesirably long development time for each chipset. Moreover, each such telephone requires a unique design, which can add to development costs.

Telecommunications systems and devices, such as cellular telephones, must synchronize a plurality of clock sources. For example, in a cellular telephone, a local clock source may be used for sampling, analog-to-digital conversion, digital-to-analog conversion, and the like. However, transmitting and receiving, as well as coding, may be in response to a remotely derived clock source, i.e., a clock derived from a remote base station.

During voice communication, it is important that audio data be processed at a constant rate. The audio data rate must adjust between the local and remote clock domains. Failure to do so can result in uneven data packet separation, which can adversely affect voice quality.

A buffer is often used to even out the packet separation. A buffer is a modified (asynchronous) FIFO (first in, first out) buffer in which packets leave the buffer at a predetermined, constant rate. Minimizing the amount of actual rate adjustment is important to prevent unnecessary delays. Excessive buffering delays transmission output, while buffer under- and/or over-flow causes gaps in the data.

SUMMARY OF THE INVENTION

These and other drawbacks in the prior art are overcome in large part by a system and method according to the present invention.

According to a specific embodiment, the present invention provides a telecommunications device. The device includes a first baseband processor in a first clock domain operable at a first clock frequency, a second baseband processor in a second clock domain operable at a second clock frequency, and first and second jitter buffer pairs interfacing between the first baseband processor and the second baseband processor domain. The first jitter buffer pair includes first and second jitter buffers, and the second jitter buffer pair includes third and fourth jitter buffers. At least one of the first and second jitter buffers and at least one of said third and fourth jitter buffers comprises a voiceband exchange buffer. The device also includes a counter for counting movement of a buffer pointer, a filter coupled to receive an output of the counter, and means for adjusting a size of a voiceband exchange buffer based on the filter output. The first or second jitter buffers and the third or fourth jitter buffers alternately fill at the first clock frequency and empty at the second clock frequency. An alternation between the first and second jitter buffers and the third and fourth jitter buffers occurs at the second clocking frequency.

According to another specific embodiment, the invention provides a telecommunication device. The device includes a GSM baseband master processor, a TDMA baseband co-processor situated uplink from the GSM baseband master processor, an uplink buffer pair including a transmit exchange buffer, a downlink buffer pair including a receive exchange buffer, a counter for counting movement of an exchange buffer pointer, a filter coupled to receive an output of the counter, and an exchange buffer adjustment unit for adjusting a size of an exchange buffer responsive to an output of the filter.

According to another specific embodiment, the present invention provides a telecommunications method. The method includes steps of counting a number of bits between consecutive frames, filtering a count to minimize jitter, and adjusting an exchange buffer size if the count is other than a predetermined count.

A better understanding of these and other various specific embodiments of the present invention is obtained when the following detailed description is considered in conjunction with the following drawings.

DETAILED DESCRIPTION OF THE INVENTION

A wireless telephone according to an embodiment of the present invention includes first and second baseband processors. The first baseband processor functions as system master, and the second processor functions as system slave. The first baseband processor interfaces to system controls, such as power supply, man-machine interface (MMI), and the like.

A wireless telephone according an embodiment of the present invention includes a GSM master baseband processor and a TDMA slave co-processor. Functions dedicated to the GSM master processor include GSM system functions and control of the GSM radio frequency (RF) functions. Functions dedicated to the slave co-processor include TDMA system functions and control of the TDMA RF functions. The master processor also controls a variety of shared functions including, for example, RF front end, display, keypad, accessories, battery, audio path, and slave processor watchdog, charging, power down, reset, etc., functions.

A wireless telephone according to another embodiment of the invention includes a GSM master processor for implementing GSM functionality in a first mode and a TDMA IS-136 co-processor for providing IS-136 functionality in a second mode. The GSM master processor controls audio input/output and an RF front end circuit in both the first and second modes. The GSM master processor controls GSM coding/decoding in the first mode, and the TDMA co-processor controls TDMA IS-136 coding/decoding in the second mode. A logic interface unit for voice data during a voice call couples the GSM master processor to the TDMA co-processor, providing a synchronous I/O on the GSM master processor side, and an asynchronous I/O on the TDMA co-processor side. The GSM master processor is clocked at a first frequency and the TDMA co-processor is clocked at a second frequency. A control link interface is provided for data during a data call.

The GSM master processor implements a first pair of buffers in the downlink direction and a second pair in an uplink direction. The buffers in the pairs are swapped periodically every 20 ms, based on an internal counter running on the GSM master processor. The timing of the GSM master processor is continuously adjusted to that of the TDMA co-processor, by counting a number of samples received from the microphone respectively fed to the earpiece between the beginning of consecutive frames. The timing of the GSM master processor is then adjusted accordingly. The output of the counter may be lowpass filtered to separate jitter from frequency deviation.

Figure 1:
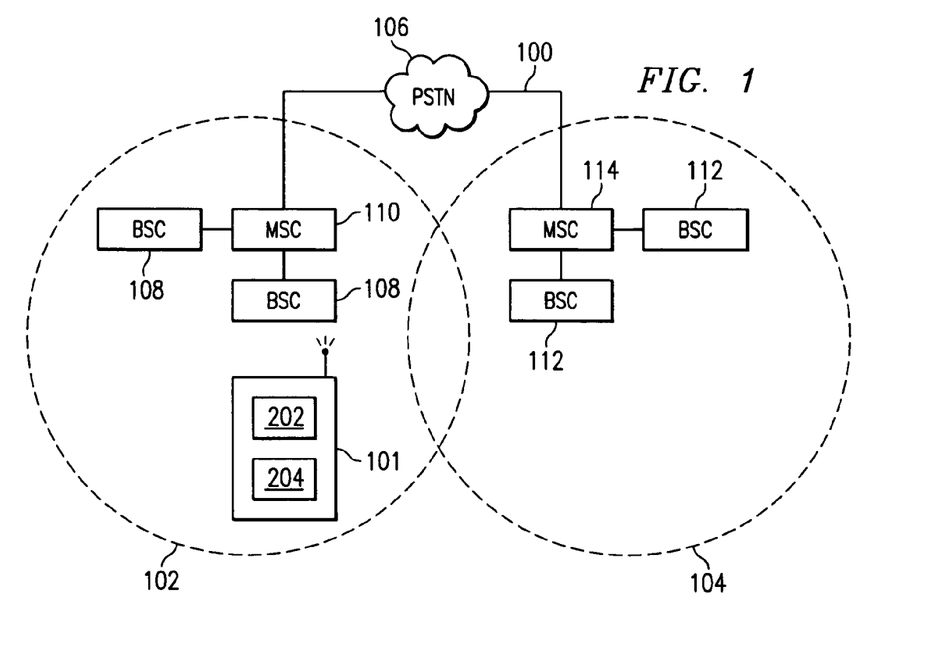
FIG. 1 is a diagram of a telecommunications system according to an embodiment of the present invention.

Turning now to the drawings and, with particular attention to FIG. 1, a diagram of a telecommunications system according to an embodiment of the present invention is shown and generally identified by the reference numeral 100. The system 100 includes a first region of operation 102 and a second region of operation 104. The first region 102 may be a GSM network, while the second region 104 may be a TDMA IS-136 network. Further, the regions 102, 104 may be overlapping as shown, or may be geographically distinct. As will be explained in greater detail below, a telecommunications device 101 according to embodiments of the present invention is operable in either the first region 102 or the second region 104.

The first region 102 includes one or more GSM base station controllers (BSC) 108 operably coupled to a GSM mobile switching center (MSC) 110. The GSM-BSC 108 and GSM-MSC 110 may operate in compliance with known systems used to implements GSM networks. The GSM-MSC 110 couples to the public switched telephone network (PSTN) 106.

The second region includes one or more IS-136 TDMA base station controllers (BSC) 112 and TDMA mobile switching centers (MSC) 114. The TDMA-BSC 112 and TDMA-MSC 114 may operate in compliance with known systems used to implements TDMA IS-136 networks. The TDMA-MSC 114 couples to the public switched telephone network (PSTN) 106.

Finally, as will be explained in greater detail below, the telecommunications device 101 includes a master processor 202 and a slave processor 204. In one embodiment, the master processor 202 is a GSM baseband processor that controls GSM codec (encoding/decoding) functions and also controls various input/output functions for the telecommunications device. The slave processor 204 is a TDMA IS-136 baseband processor that handles IS-136 codec functions.

Figure 2:
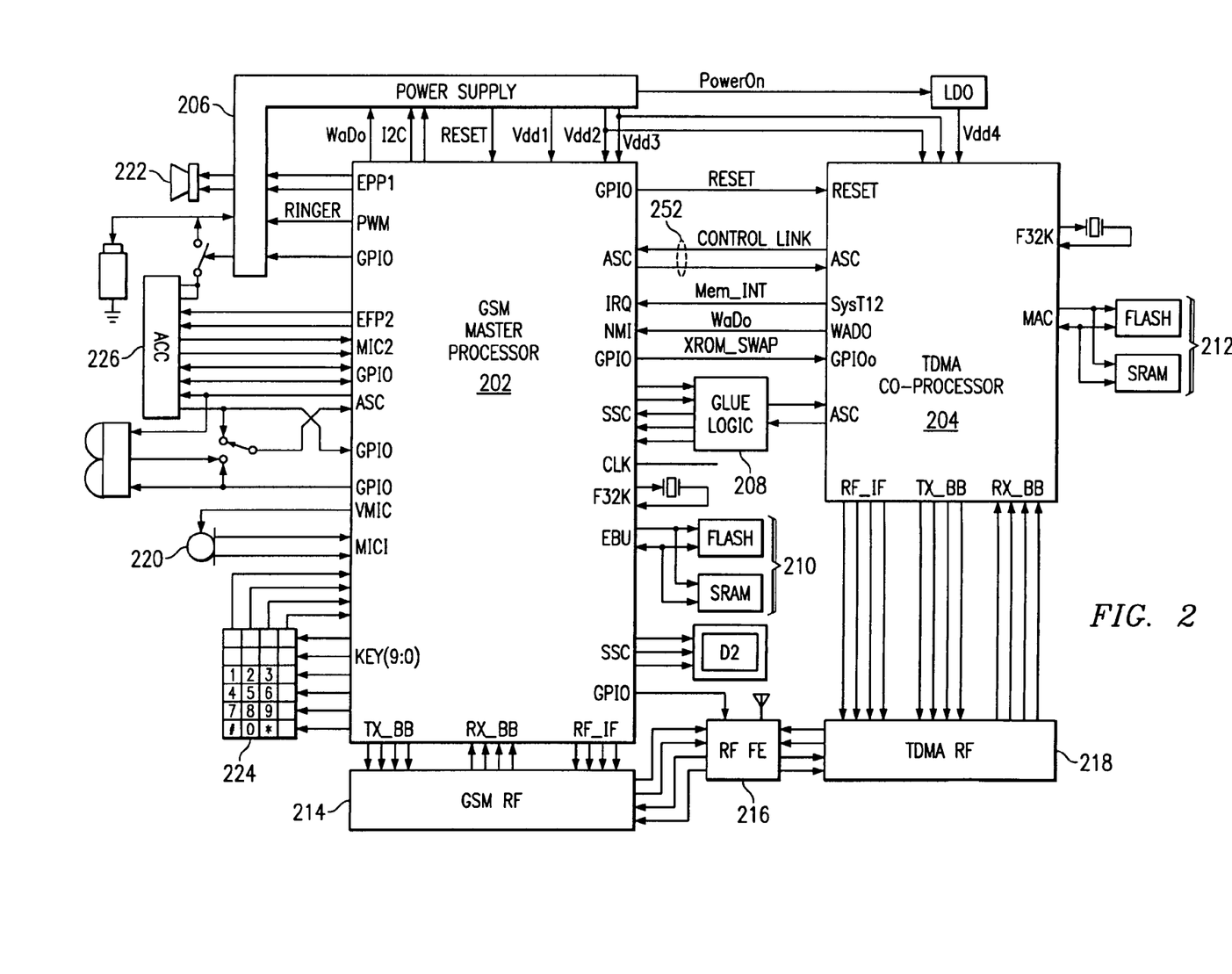
FIG. 2 is a block diagram of a telecommunications device according to an embodiment of the present invention.

More particularly, FIG. 2 is a block diagram of a telecommunications device 101 according to an embodiment of the present invention. As noted above, in the embodiment illustrated, the telecommunications device 101 includes a GSM master processor 202 and a TDMA slave co-processor 204. The GSM master processor 202 interfaces to a power supply controller 206 and various I/O devices, such as a microphone 220, a speaker 222, keypad 224, and accessory interface 226. The GSM master processor 202 also couples to memory 209, such as Flash memory and static random access memory (SRAM). In addition, as will be explained in greater detail below, the GSM master processor 202 couples to a GSM RF unit 214 and an RF front end (FE) unit 216. The GSM master processor 202 also couples directly and via glue logic 208 to the TDMA co-processor 204. In one embodiment, the glue logic 208 provides various synchronization logic between the GSM master processor 202 and the TDMA co-processor 204 and, in particular, provides an asynchronous serial interface (ASC) to the TDMA co-processor and a synchronous serial interface to the GSM master processor 202. While the glue logic may be implemented as any interface logic suitable to provide an interface, exemplary interface logic is described in greater detail below.

The TDMA co-processor 204 further couples to memory 212, such as Flash memory and/or static random access memory (SRAM), and to a TDMA RF unit 218. The TDMA RF unit 218 further couples to the RF front end unit 216.

In operation, the TDMA co-processor 204 controls TDMA system related functions and the TDMA RF unit 218. The GSM master processor 202 controls all GSM system related functions and the GSM RF unit 214. In addition, the GSM master processor 202 controls the RF front end 216, the power supply 206, and the input/output functions, such as display, keypad and audio path. The GSM master processor 202 also controls the TDMA co-processor 204.

For example, the GSM master processor 202 provides reset control of the TDMA co-processor 204 via the reset control link 250. Once the GSM master processor 202 has been reset by the system, the RESET signal to the TDMA co-processor 204 forces the TDMA co-processor 204 to reset. In addition, the GSM master processor 202 controls whether the TDMA co-processor 204 is booted by an internal or external command via a separate control signal via an I/O pin.

All commands and data, except audio data, from the GSM master processor 202 to the TDMA co-processor 204 are transferred via a dedicated asynchronous interface 252. The GSM master processor is booted directly via the accessory interface 226. The TDMA co-processor 204 is booted via the same interface 226, with all data being passed from the GSM master processor 202 via the control interface 252. The GSM master processor also functions as system watchdog and watches the TDMA co-processor's watchdog on a non-maskable interrupt (NMI). If any violation occurs, the GSM master processor executes an exit routine.

The GSM master processor 202 controls the power supply unit 206. For example, the GSM master processor 202 may implement a known battery charging algorithm and supervise, e.g., voltage and temperature measurements. During an active GSM connection, the GSM master processor receives relevant timing information from the internal system timer (not shown). During a TDMA connection, the timing information is acquired from an external interrupt derived from a system timer of the TDMA co-processor 204.

Finally, during a GSM call, the entire voice functionality, except voice encoding/decoding is provided via the GSM master processor 202. During a TDMA call, all relevant voice data is transmitted from the GSM master processor via the glue logic 208, which provides a synchronous interface on the GSM processor side and an asynchronous interface on the TDMA processor side. The glue logic 208 may be any circuitry that can interface between the processors.

Figure 3:
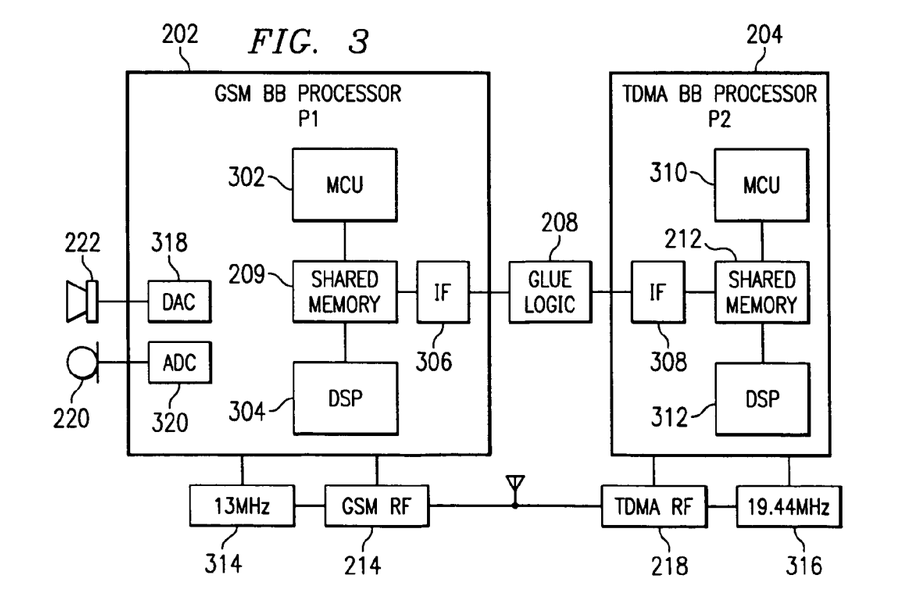
FIG. 3 is a more detailed diagram of the telecommunications device of FIG. 2.

FIG. 3 illustrates in greater detail various aspects of the audio functionality of the system 101. Shown are the GSM master processor 202 and the TDMA co-processor 204. The GSM master processor 202 includes a master control unit (MCU) 302 and a DSP 304. The MCU 302 and DSP 304 share a memory 209, which may be on-chip memory. The GSM master processor 202 interfaces to the glue logic 208 via interface 306. Also shown in the GSM master processor 202 are a digital to analog converter 318 and an analog to digital converter 320 for interfacing the speaker 222 and microphone 220, respectively. A 13 MHz clock 314 couples to the GSM master processor 202 and the GSM RF unit 214.

Similarly, the TDMA co-processor 204 includes MCU 310 and DSP 312. Again, a shared memory 212 may be provided on chip. A 19.44 MHz clock 316 couples to the TDMA co-processor 204 and the TDMA RF unit 218. The TDMA co-processor 204 interfaces to the glue logic 208 via interface 308.

In certain embodiments of the present invention, during TDMA mode, the TDMA co-processor provides only IS136 encoding/decoding, voice encoding/decoding and control of TDMA RF. Any other processing is provided by the GSM master processor.

In operation, the master control unit 302 of the GSM master processor 202 selects the mode of operation, e.g., whether GSM mode or TDMA IS-136 mode. If GSM mode is selected (e.g., by detection of known GSM control signals, or by factory pre-set or manual user selection), then the GSM master processor 202 directs the TDMA processor 204 to enter a shut down or standby mode.

The MCU 302 then supervises GSM operation. Thus, audio input is received via microphone 220 and converted to digital using ADC 320. The MCU 302 then supervises the DSP 304, which performs any necessary filtering and encoding, and the like. The voice signals are then provided to the GSM RF unit 214 and the RF front end (FIG. 2), which perform RF modulation functions, and then transmitted to the network. Similarly, in the downlink direction, signals are received at the front end 216 and demodulated in the GSM RF unit 214. The signals are then received at the DSP 304, filtered and decoded, then converted to analog using DAC 318, and then provided out speaker 222.

If the TDMA mode is selected, however, both the GSM master processor 202 and the TDMA co-processor 204 are in an operational mode. In the TDMA mode, audio signals are received through microphone 220 and converted to digital using ADC 320. The signals are then provided across interface 306, glue logic 208, and interface 308 to the TDMA co-processor 204. The MCU 302 and MCU 310 may exchange various control signaling, as well. The MCU 310 of the TDMA co-processor 204 then supervises TDMA functioning. Thus, the signals are provided to the DSP 312 for filtering and encoding and then to the TDMA RF 218 for modulation. The modulated signals are then provided to the RF front end 216 (FIG. 2), which is controlled by the GSM master processor 202. The signals are then transmitted.

For receiving, the signals are received at the RF front end 216 and provided to the TDMA RF unit 218 for demodulation. The demodulated signals are then received at the DSP 312 and filtered, decoded and voice decoded. The MCU 310 then supervises transporting the signals via the IF 308 to the glue logic 208 and then the IF 306. The DSP 304 then performs all post processing and provides the data signals to the DAC 318 and out speaker 222.

Figure 4:
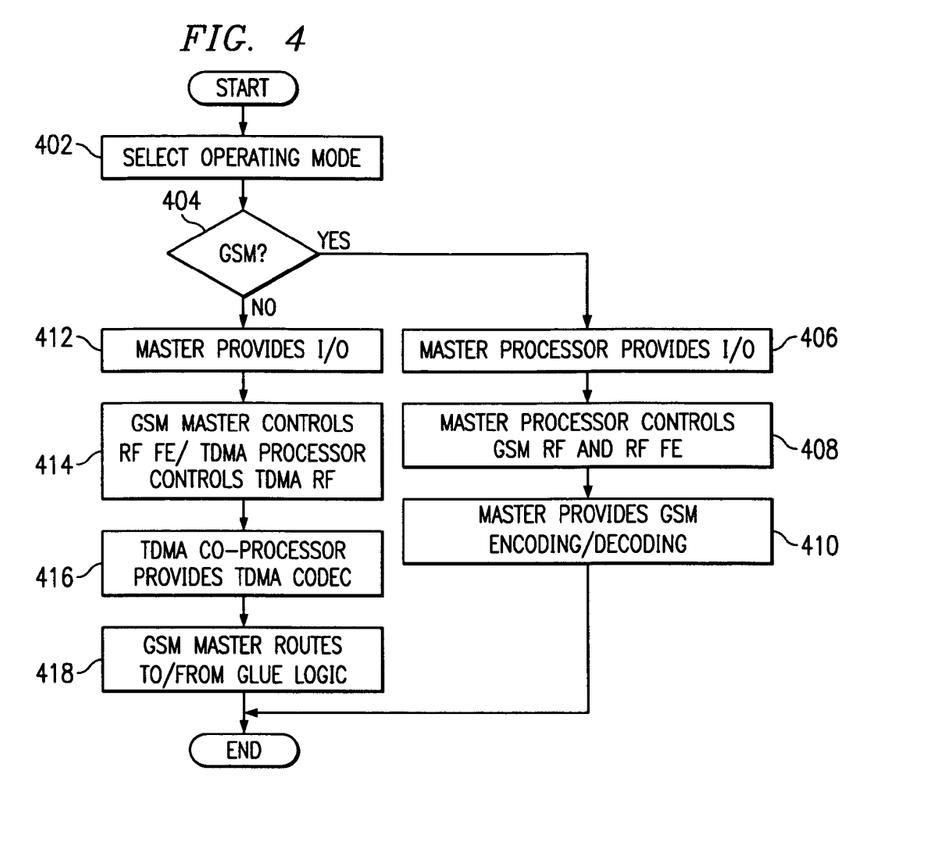
FIG. 4 is a flowchart illustrating operation of a system according to an embodiment of the present invention.

Turning now to FIG. 4, a flowchart illustrating functionality provided by a telecommunications device according to an embodiment of the present invention 20 is shown. In 402, an operating mode (e.g., GSM or IS-136) is selected. As noted above, this may be done either by the system detecting whether a GSM or IS-136 base station is present; or by a manual selection; or by a factory pre-set, according to various embodiments. If the device is operating in GSM mode, as determined in step 404, then in 406, the GSM master processor 202 provides the user interface, audio input/output controls. In 408, the master processor 202 also controls the GSM RF functions (e.g., modulation/demodulation) and also controls an RF front end circuit 216. In 410, the GSM master processor 202 also controls GSM coding and decoding functionality.

In step 404, if the mode was determined to be the IS-136 mode, then in step 412, the master would again provide the user interface and audio I/O functions. In step 414, the GSM master processor 202 further controls the RF front end 216, but the TDMA co-processor controls the TDMA RF functions. In step 416, the TDMA co-processor handles TDMA IS-136 coding and decoding functions, and the GSM master processor controls signal and data routing between the processors, with the data being transmitted via the interface glue logic in step 418.

Figures 5A, 5B:
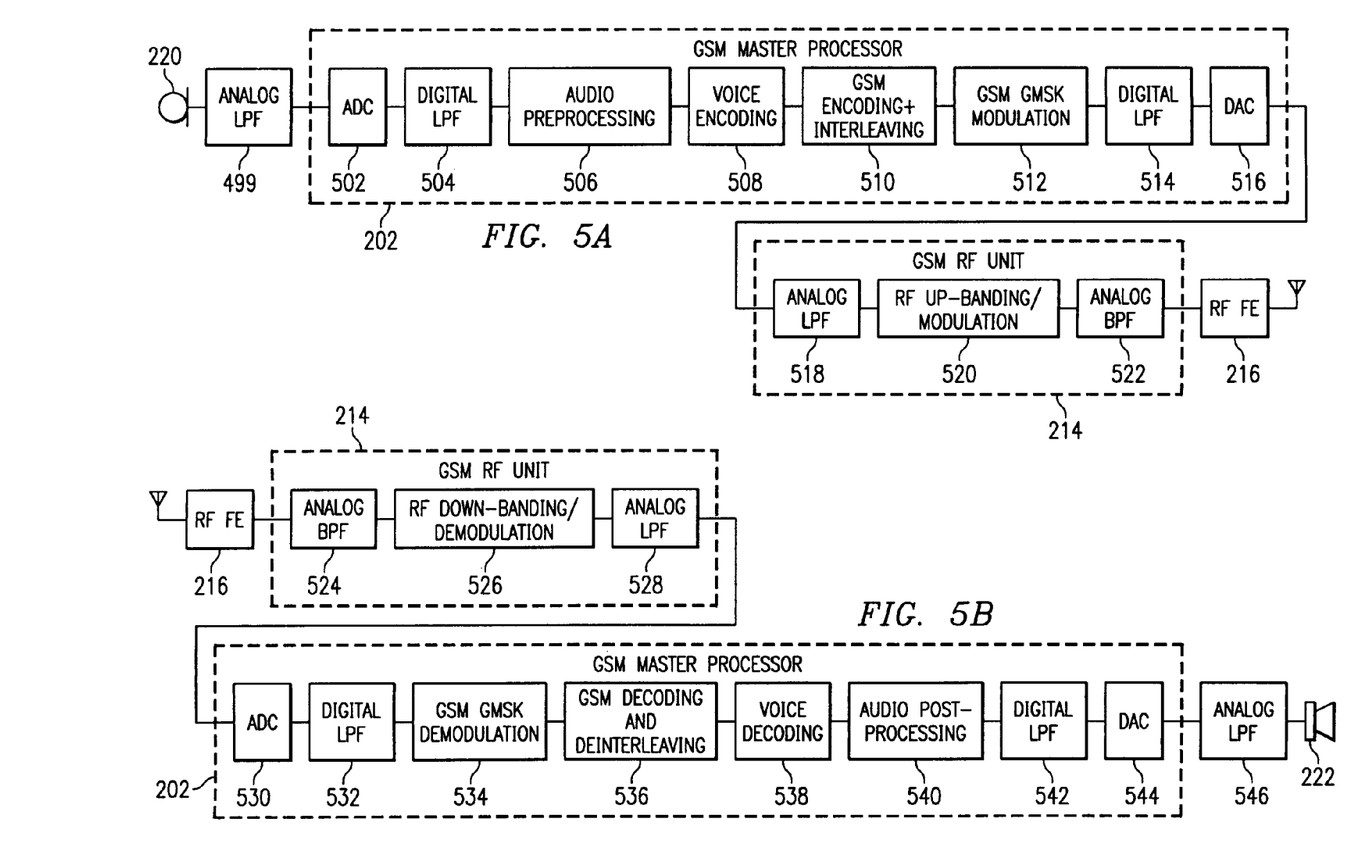
FIG. 5A and FIG. 5B illustrate uplink and downlink GSM handling for a voice call according to an embodiment of the present invention.

FIG. 5A and FIG. 5B illustrate the uplink and downlink handling, respectively, of GSM voice calls according to an embodiment of the present invention, The system receives voice data as input over the microphone 220. After low pass filtering, using discrete filter 499 the data are then processed by the GSM processor 202, the GSM RF unit 214 and then the RF front end unit 216. In particular, in the GSM processor 202, the voice signals are analog-to-digital converted by ADC 502 and then filtered using audio filter 504. An audio preprocessing unit 506 performs preprocessing such as noise reduction and echo cancellation. The system then performs voice encoding using voice encoding unit 508, and GSM encoding at GSM encoding/interleaving unit 510. Next, the GSM modulation unit 512 performs GSM modulation (GMSK), and the modulated signals are filtered at GSM lowpass filter 514 and digital analog converted at DAC 516. The GSM RF unit 214 then performs RF upband and modulation at unit 518, RF bandpass filtering at unit 520, and analog bandpass filtering at BPF 522. The voice signals are then transmitted at RF FE 216.

Downlink handling of GSM voice data is similar, and is shown in FIG. 5B. Radio signals are received at the RF front end 216 and then handed off to the GSM RF unit 214. The GSM RF unit 214 performs bandpass filtering 524, RF downbanding and demodulation 526, and low pass filtering at unit 528 before the signal is provided to the GSM processor 202. The GSM processor 202 performs analog to digital conversion at ADC 530, lowpass filtering 532; GSM signal demodulation and equalization 534, GSM decoding and de-interleaving 536, voice decoding 538; audio post-processing 540; audio filtering 542; and digital to analog conversion 544. The audio is then low pass filtered again at unit 546 and output at speaker 222.

Figures 6A, 6B:
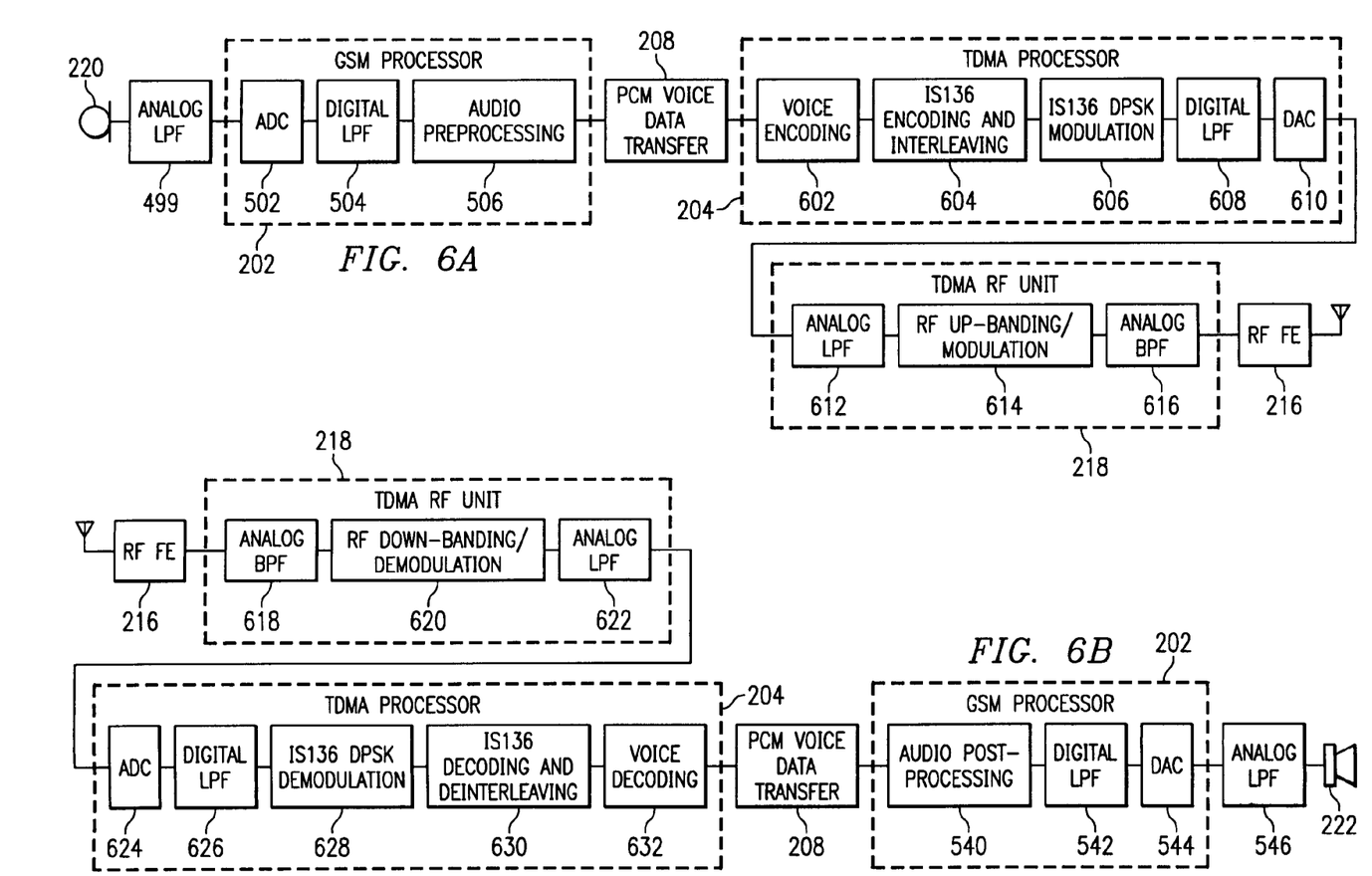
FIG. 6A and FIG. 6B illustrate uplink and downlink TDMA handling for a voice call according to an embodiment of the present invention.

Uplink and downlink voice TDMA are illustrated in FIGS. 6A and 6B. Audio data is received at the microphone 220, low pass filtered at 499 and provided to the GSM processor 202. The GSM processor 202 performs analog to digital conversion 502, audio filtering 504, and audio preprocessing 506 (e.g., noise reduction and echo cancellation). A PCM data transfer via logic 208 transfers the data to the TDMA processor 204. The TDMA processor 204 then performs voice encoding 602, TDMA encoding/interleaving 604, TDMA signal modulation (DPSK) 606, TDMA low pass filtering 608 and digital-to-analog conversion 610. The signals are then provided to the TDMA RF unit 218 for low pass filtering at 612, upbanding and modulation at 614, and band pass filtering at 616. Finally, the signals are transmitted at the RF front end 216.

Downlink voice TDMA is similar, and is shown in FIG. 6B. Signals are received at the RF front end 216 and provided to the TDMA RF unit 218 for bandpass filtering 618, RF downbanding and demodulation 620, and low pass filtering 622. The TDMA processor 204 then performs analog to digital conversion 624, TDMA lowpass filtering 626, TDMA signal demodulation 628, TDMA decoding/de-interleaving 630, and voice decoding 632. A PCM data transfer using logic 208 then transfers the data to the GSM processor 202. The GSM processor 202 then performs audio postprocessing 540, audio filtering 542, and digital to analog conversion 644. The signal is filtered at LPF 546 and output sat speaker 222.

Figure 7A:
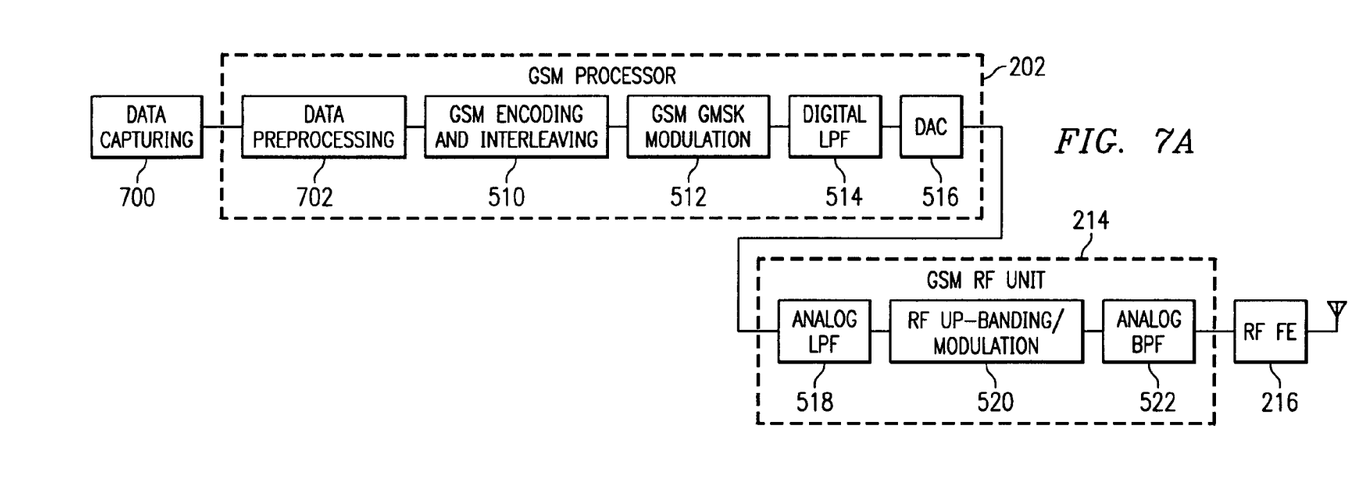
FIG. 7A and FIG. 7B illustrate uplink and downlink GSM handling for a data call according to an embodiment of the present invention.
Figure 7B:
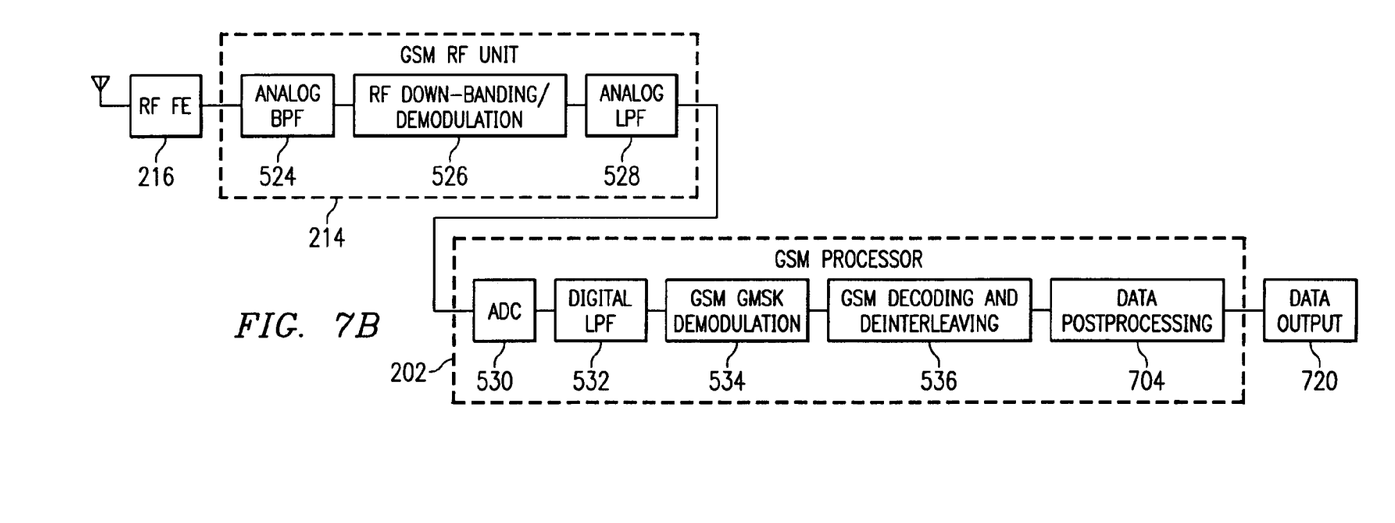

FIG. 7A and FIG. 7B illustrate handling of GSM data calls according to an embodiment of the present invention. FIG. 7A illustrates the uplink side. At 700, data are captured (e.g., UART or IrDA). The captured data are provided to the GSM processor 202, which performs data pre-processing 702, GSM coding/interleaving 510, GSM signal modulation 512, GSM lowpass filtering 514, and digital-to-analog conversion 516. The GSM RF unit 214 then performs lowpass filtering 518, RF upbanding and modulation 520, and RF bandpass filtering 522. The data are then transmitted using the RF front end 216.

Downlink handling is similar, as shown in FIG. 7B. The RF front end 216 receives the RF data signals. The GSM RF unit 214 performs RF bandpass filtering 524, RF downbanding and demodulation 526, and low pass filtering 528. The data are then provided to the GSM processor 202, which performs analog digital conversion 530, GSM lowpass filtering 532, GSM signal demodulation 534, GSM decoding/de-interleaving 536, and finally after data post processing 704, outputs the data at 720.

Figure 8A:
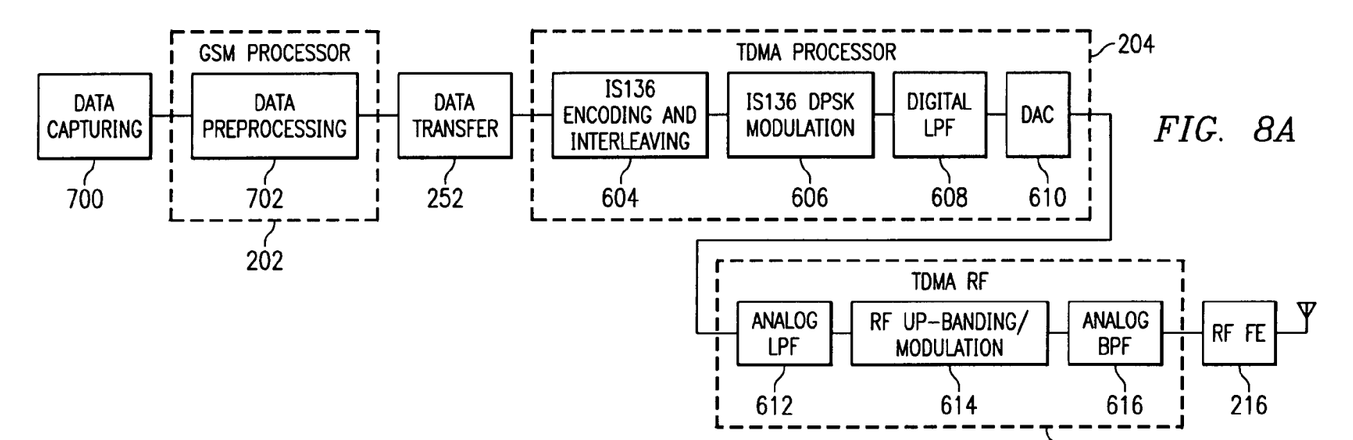
FIG. 8A and FIG. 8B illustrate uplink and downlink TDMA handling for a data call according to an embodiment of the present invention.
Figure 8B:
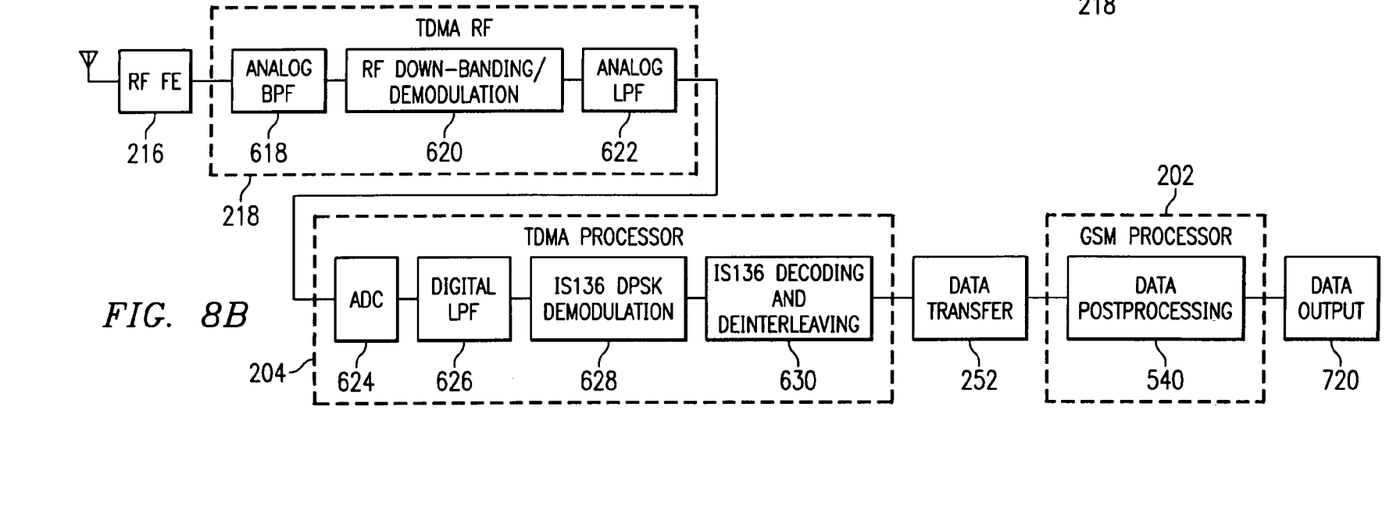

FIG. 8A and FIG. 8B illustrate uplink and downlink TDMA data handling, respectively. At 800, data are captured. The data are received at the GSM processor 202 for pre-processing 702 and transferred via logic 252 to the TDMA processor 204. The TDMA processor 204 performs TDMA coding/interleaving 604, TDMA signal modulation 606, TDMA lowpass filtering 608 and digital-to-analog conversion 610. The signals are then sent to the TDMA RF unit 218, which performs low pass filtering 612, RF upbanding and modulation 614, and RF bandpass filtering 616. Finally, the signals are transmitted using RF front end 216.

Downlink handling (FIG. 8B) is similar. The radio signals are received by the RF front end 216 and sent to the TDMA RF unit 218 for bandpass filtering 618, RF downbanding and demodulation 620, and low pass filtering 622. The signals are then sent to the TDMA processor 204 for analog-to-digital conversion 624, TDMA lowpass filtering 626, TDMA signal demodulation/de-interleaving 628, and decoding 630. The demodulated data are then transferred to the GSM processor 202 for post-processing at 540 via the logic 208 and, finally, are output by the GSM processor at 722.

As noted above, the GSM master processor 202 and the TDMA slave processor 204 are clocked by different clocks, i.e., clocks 314 and 316, respectively. In order to synchronize the processors and eliminate jitter, a rate adjustment mechanism according to embodiment of the present invention is provided.

More particularly, as will be explained in greater detail below, the GSM master processor 202 implements a first pair of buffers in the downlink direction and a second pair in an uplink direction. The buffers in the pairs are swapped periodically every 20 ms, based on an internal counter running on the GSM master processor 202. The timing of the GSM master processor 202 is continuously adjusted to that of the TDMA co-processor 204, by counting a number of samples written into a TX voice band exchange buffer between the beginning of consecutive frames at interface 306. The timing of the GSM master processor 202 is then adjusted accordingly. The output of the counter may be lowpass filtered to separate jitter from frequency deviation.

Figure 9A:
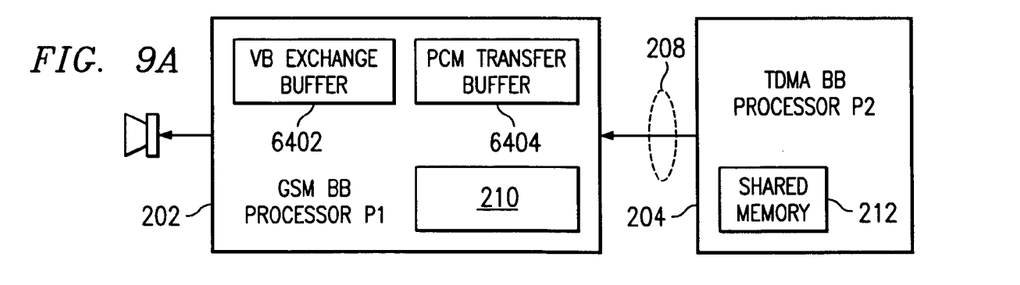
FIG. 9A and FIG. 9B illustrate TDMA voice signal transfer buffers according to an implementation of the present invention.
Figure 9B:
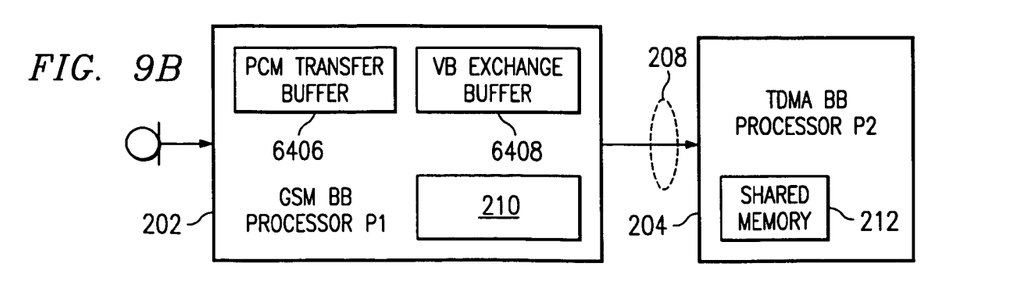

This is shown more particularly with reference to FIG. 9A and FIG. 9B. In the downlink direction, the TDMA co-processor 204's voice decoder feeds 160 samples of one voice frame to the shared memory 212 at once after the data has been decoded. Once the data are written, a DMA transfer to the ASC interface logic 208 (FIG. 2) is set up. For each byte that TDMA co-processor 204 sends over the ASC 208, it receives a byte back from the GSM master processor 202. While samples are sent to the GSM master processor 202, they are stored in the shared memory 209. These samples are used for voice encoding within the next frame to be transmitted. The data transfer of one complete voice frame takes approximately 7 ms every 20 ms+/−3 ms jitter (based on the 20 ms local clock of the TDMA co-processor 204).

On the GSM master processor 202 side, the received voice data are fed directly to the DSP 304 via the synchronous interface 306 and stored in the RX transfer buffer 6404. The contents of the downlink voice band exchange buffer 6402 are fed to the speaker continuously one sample every 125 us. Every 20 ms the buffers 6402, 6404 are swapped, as will be explained in greater detail below.

In the uplink direction (FIG. 9B), all voice data of one frame coming from the microphone are stored in the uplink voice band exchange buffer 6406. The contents of the TX transfer buffer 6408 are transferred to the co-processor at the same time. At the moment the receive buffers 6402, 6404 are swapped, the transmit buffers 6406, 6408 are swapped too.

The buffer swapping is triggered by an internal interrupt every 20 ms based on the local clock of the GSM main processor 202. A pointer counts the number of samples between the start of consecutive frames. If that number is higher or lower than 160, the GSM master processor clock is adjusted accordingly. To avoid an overrun of the voiceband exchange buffers, they may be adjusted one sample. In order to separate jitter from the frequency deviation, the pointers are low pass filtered. The interpolation or extrapolation of the sample may be done by adjusting the filter coefficients.

In operation, rate adjustment is accomplished through swapping the buffers 6402, 6404 and 6406, 6408. More particularly, every 20 millisecond based on the adjusted local clock of the GSM main processor 202, the uplink buffers 6402, 6404 are swapped and the downlink buffers 6406, 6408 are swapped. Thus, after the swap, the buffers 6406, 6402 are the PCM Transfer buffers, whereas the buffers 6408, 6404 are voice band exchange buffers.

The point of time of the wraparound is chosen such that all pre- and post-processing occurs in the same frame as the data transfer, to minimize the round trip delay. Pre- and post-processing can include noise reduction and echo cancellation. More particularly, shown in FIG. 10A is a timing diagram illustrating selection of the wraparound time.

Figure 10A:
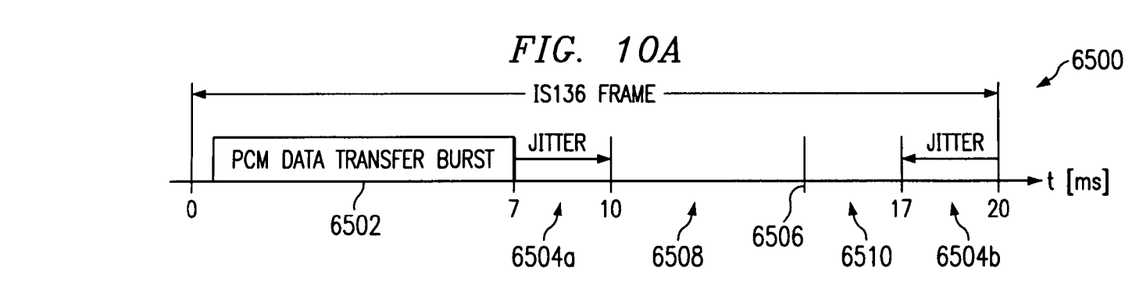
FIG. 10A and FIG. 10B illustrate timing of wraparound according to an implementation of the present invention.

Shown in FIG. 10A are a 20 ms frame 6500, a PCM voice data burst 6502 (i.e., a 7 ms burst), jitter margins 6504*a* and 6504*b*, a wraparound time 6506, and preprocessing 6508 and postprocessing 6510. As shown, the wraparound time 6506 is chosen after the PCM voice data burst 6502 and beyond the jitter variation 6504a. Further, as can be seen, the pre-processing 6508 is done before the wraparound, and the post-processing 6510 is done after the wraparound.

The system of embodiments of the present invention is adapted to synchronize the timing of the processors. To do so, the movements of the voice band exchange buffer pointer are counted between the appearance of the first sample of two consecutive frames at the interface. If the count is equal to 160, then the processors 202, 204 are well aligned. Otherwise, the timing on the GSM master processor 202 is adjusted. In addition, to separate the frequency deviation from the jitter, the counter may be passed through a lowpass filter. Since the maximum mismatch after rate adaptation is 1 sample per approximately 2 s to 10 s, an additional interpolation of the voice signal may not be needed.

Figure 10B:
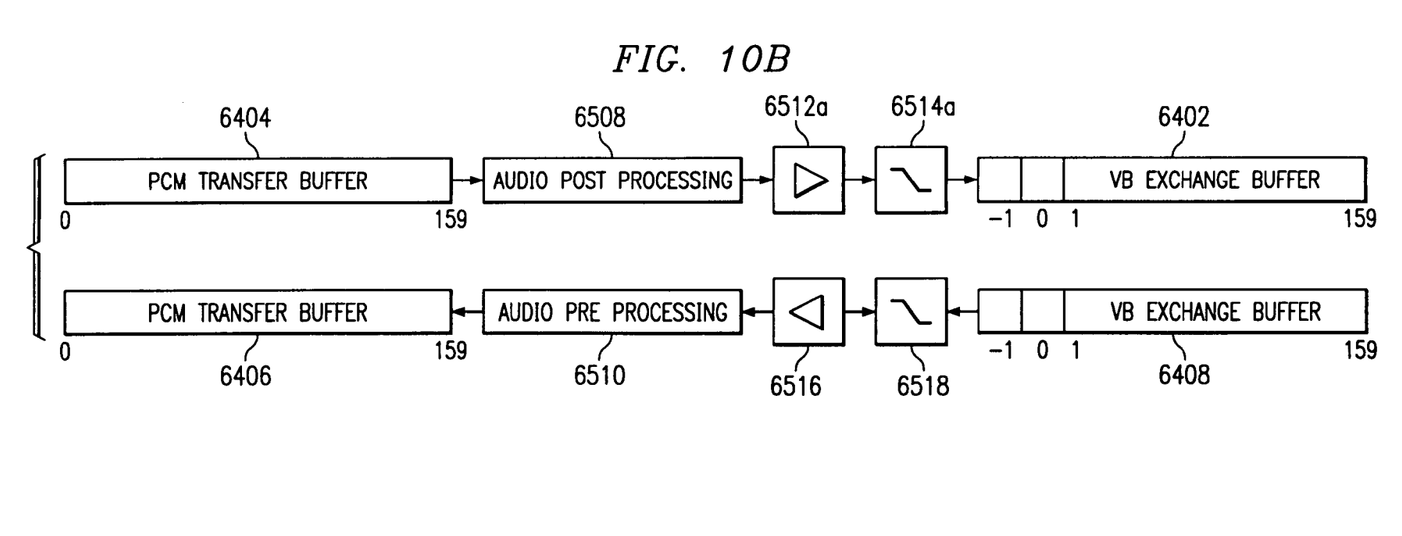

This is illustrated schematically in FIG. 10B. As shown, the buffer 6404 functions as the PCM TX transfer buffer and the buffer 6402 functions as the VB TX exchange buffer. The buffer 6406 functions as the PCM RX transfer buffer, and the buffer 6408 functions as the VB RX exchange buffer. At 6404 is a PCM voice data receive burst. The 160 samples are then provided to post-processing 6508, a lowpass filter 6512*a,* and the count 6514*a*. The timing is adjusted in the exchange buffer 6402.

At the same time as this receive process, a similar transmit process occurs. Thus, the output of the VB exchange buffer 6408 is counted at 6518, filtered at 6516 and pre-processing occurs at 6510. The contents of the buffer are then transmitted at 6406.

This disclosure is illustrative and not limiting. The particular materials disclosed and the parameters of their use are also illustrative and not limiting; one of ordinary skill in the field will appreciate that various substitutions and modifications can be made. In any case, such modifications or substitutions are intended to fall within the scope of the appended claims.

What is claimed is:

1. A telecommunications device, comprising:
a first baseband processor in a first clock domain operable at a first clock frequency;
a second baseband processor in a second clock domain operable at a second clock frequency;
first and second jitter buffer pairs interfacing between said first baseband processor and said second baseband processor domain, said first jitter buffer pair comprising first and second jitter buffers, and said second jitter buffer pair comprising third and fourth jitter buffers at least one of said first and second jitter buffers, and at least one of said third and fourth jitter buffers comprising a voiceband exchange buffer;
a counter for counting movement of a buffer pointer;
a filter coupled to receive an output of said counter;
means for adjusting a number of samples needed to fill a voiceband exchange buffer based on said filter output;
wherein said first or second jitter buffers and said third or fourth jitter buffers alternately fill at a rate according to said first clock frequency and empty at a rate according to said second clock frequency, wherein alternation between said first and second jitter buffers and said third and fourth jitter buffers occurs at a rate according to said second clocking frequency.

2. A telecommunications device in accordance with claim 1, said first baseband processor comprising a GSM master processor, said second baseband processor comprising a TDMA co-processor.

3. A system in accordance with claim 1, said filter comprising a lowpass filter.

4. A system in accordance with claim 2, wherein said counter counts between consecutive PCM frames.

5. A telecommunication device, comprising:
a GSM baseband master processor;
a TDMA baseband co-processor situated uplink from said GSM baseband master processor;
an uplink buffer pair, including a transmit exchange buffer;
a downlink buffer pair including a receive exchange buffer;
a counter for counting movement of an exchange buffer pointer;
a filter coupled to receive an output of said counter; and
an exchange buffer adjustment unit for adjusting a size-of number of samples needed to fill an exchange buffer responsive to an output of said filter.

6. A telecommunications device in accordance with claim 5, wherein said uplink buffers and said downlink buffers alternately fill at a first clock frequency and empty at a second clock frequency.

7. A telecommunications device in accordance with claim 5, said filter comprising a lowpass filter.

8. A telecommunications device in accordance with claim 5, wherein said counter counts between frames.

9. A telecommunications method, comprising:
counting a number of bits between consecutive frames;
filtering a count to minimize jitter; and
adjusting a number of samples needed to fill an exchange buffer if said count is other than a predetermined count.

10. A telecommunications method in accordance with claim 9, said filtering comprising lowpass filtering.

11. A telecommunications method in accordance with claim 9:
further comprising adjusting a clock responsive to said count.

12. A method in accordance with claim 11, further including third and fourth jitter buffers, adapted to receive blocks of samples at said second clock rate and transmit a plurality of samples at said first clock rate, comprising:
switching between using said third or fourth jitter buffers at said second clock rate.

13. A method for rate adjustment, comprising:
receiving at first or second utter buffers a plurality of samples at a first clock rate and transmitting a block of said samples at a second clock rate; and
switching between using said first or second utter buffers at said second clock rate;
receiving at third or fourth jitter buffers blocks of samples at said second clock rate and transmitting a plurality of samples at said first clock rate; and
switching between using said third or fourth jitter buffers at said second clock rate; and
adjusting said second clock rate responsive to a count of samples in a voice frame so as to control a number of samples needed to fill at least one of said jitter buffers.

14. A method, comprising:
providing first circuitry in a first clock domain operable at a first clock frequency;
providing second circuitry in a second clock domain operable at a second clock frequency;
providing first and second jitter buffers interfacing between said first circuitry and said second circuitry domain;
wherein said first or second jitter buffers alternately fill at said first clock frequency and empty at said second clock frequency, wherein alternation between said first and second jitter buffers occurs at said second clocking frequency, and wherein said second clocking frequency is adjusted responsive to a count of a number of samples in at least one of said buffers so as to control a number of samples needed to fill at least one of said buffers.

15. A method in accordance with claim 14, said first circuitry comprising an audio input, said second circuitry comprising an encoder.

16. A method in accordance with claim 14, said first circuitry comprising an audio output, said second circuitry comprising a decoder.

17. A method in accordance with claim 15, said first clock frequency comprising a sample clock, said second clock frequency comprising a frame clock.

18. A system, comprising:
first circuitry in a first clock domain operable at a first clock frequency;
second circuitry in a second clock domain operable at a second clock frequency;
first and second pairs of jitter buffers interfacing between said first circuitry and said second circuitry domain;
wherein ones of said pairs of first or second jitter buffers are swapped according to a clock by which said ones of said pairs of first or second jitter buffers are filled or emptied; and wherein said clock is adjusted based upon a count of a number of samples in a frame in at least one of said buffers.

19. A system, comprising:
first circuitry in a first clock domain operable at a first clock frequency;
second circuitry in a second clock domain operable at a second clock frequency;
first and second jitter buffer pairs interfacing between said first circuitry and said second circuitry domain, said first jitter buffer pair comprising first and second jitter buffers, and said second jitter buffer pair comprising third and fourth jitter buffers;
wherein said first or second jitter buffers and said third or fourth jitter buffers alternately fill at said first clock frequency and empty at said second clock frequency, wherein alternation between said first and second jitter buffers and said third and fourth jitter buffers occurs at said second clocking frequency and wherein said second clocking frequency is adjusted based upon a count of a number of samples in a frame in at least one of said buffers.

20. A system in accordance with claim 19, said first circuitry comprising an audio input, said second circuitry comprising an encoder.

21. A system in accordance with claim 19, said first circuitry comprising an audio output, said second circuitry comprising a decoder.

22. A system in accordance with claim 20, said first clock frequency comprising a sample clock, said second clock frequency comprising a frame clock.

23. A telecommunication system, comprising:
an audio input;
an audio output;
interface circuitry comprising first and second jitter buffers operably coupling said audio input to a voice encoder and third and fourth jitter buffers operably coupling said audio output to a voice decoder;
wherein said first or second jitter buffers alternately fill at a first clock frequency and empty at a second clock frequency, wherein alternation between said first and second jitter buffers occurs at said second clock frequency; and
wherein said third or fourth jitter buffers alternately fill at said second clock frequency and empty at said first clock frequency, wherein alternation between said third and fourth jitter buffers occurs at said second clock frequency and wherein said second clock frequency is adjusted based upon a count of a number of samples in at least one of said buffers.

24. A system in accordance with claim 23, said interface circuitry comprising one or more digital signal processors.

25. A system in accordance with claim 24, said first clocking frequency comprising a POM sample clock frequency.

26. A system in accordance with claim 25, said second clock frequency comprising a frame clock frequency.

27. A system in accordance with claim 26, wherein a frame comprises 160 samples.

28. A system in accordance with claim 27, wherein a size of said first, second, third, and fourth buffers is 165 samples.

* * * * *